United States Patent [19]

Gilles et al.

[11] Patent Number: 4,595,797

[45] Date of Patent: Jun. 17, 1986

[54] RINGING SIGNAL GENERATOR FOR A SUBSCRIBER TELEPHONE SET

[75] Inventors: Bernard Gilles, Cergy; Raphaël Roux, Argenteuil; José Paulet, Courbevoie, all of France

[73] Assignee: Thomson-CSF Telephone, Colombes, France

[21] Appl. No.: 632,464

[22] Filed: Jul. 19, 1984

[30] Foreign Application Priority Data

Jul. 22, 1983 [FR] France .............................. 83 12174

[51] Int. Cl.⁴ .............................................. H04M 3/22
[52] U.S. Cl. ................................................. 179/84 A
[58] Field of Search ............... 179/84 R, 84 A, 84 VF, 179/51 AA, 17 E, 18 HB, 18 FA

[56] References Cited

U.S. PATENT DOCUMENTS

| | | | |
|---|---|---|---|
| 4,211,896 | 7/1980 | Ferrieu | 179/84 A X |
| 4,239,935 | 12/1980 | Bosik | 179/84 R |
| 4,306,118 | 12/1981 | Ciboulet et al. | 179/18 HB X |
| 4,370,526 | 1/1983 | Schoofs et al. | 179/51 AA |

FOREIGN PATENT DOCUMENTS 0051446 10/1981 European Pat. Off. .
2133148  7/1971 Fed. Rep. of Germany .

OTHER PUBLICATIONS

Patents Abstracts of Japan, vol. 7, No. 40, (E-159) (1185), Feb. 17, 1983 & JP-A-57 190 449 (Fujitsu K.K.) (24-11-1982).

Primary Examiner—James L. Dwyer
Attorney, Agent, or Firm—Oblon, Fisher, Spivak, McClelland & Maier

[57] ABSTRACT

A ringing signal generator for a subscriber telephone set comprising a switch switching the input signal, followed by a phase shifter and two symmetrical amplifiers having a very high output impedance at rest. The lines are driven through isolating capacitors.

3 Claims, 1 Drawing Figure

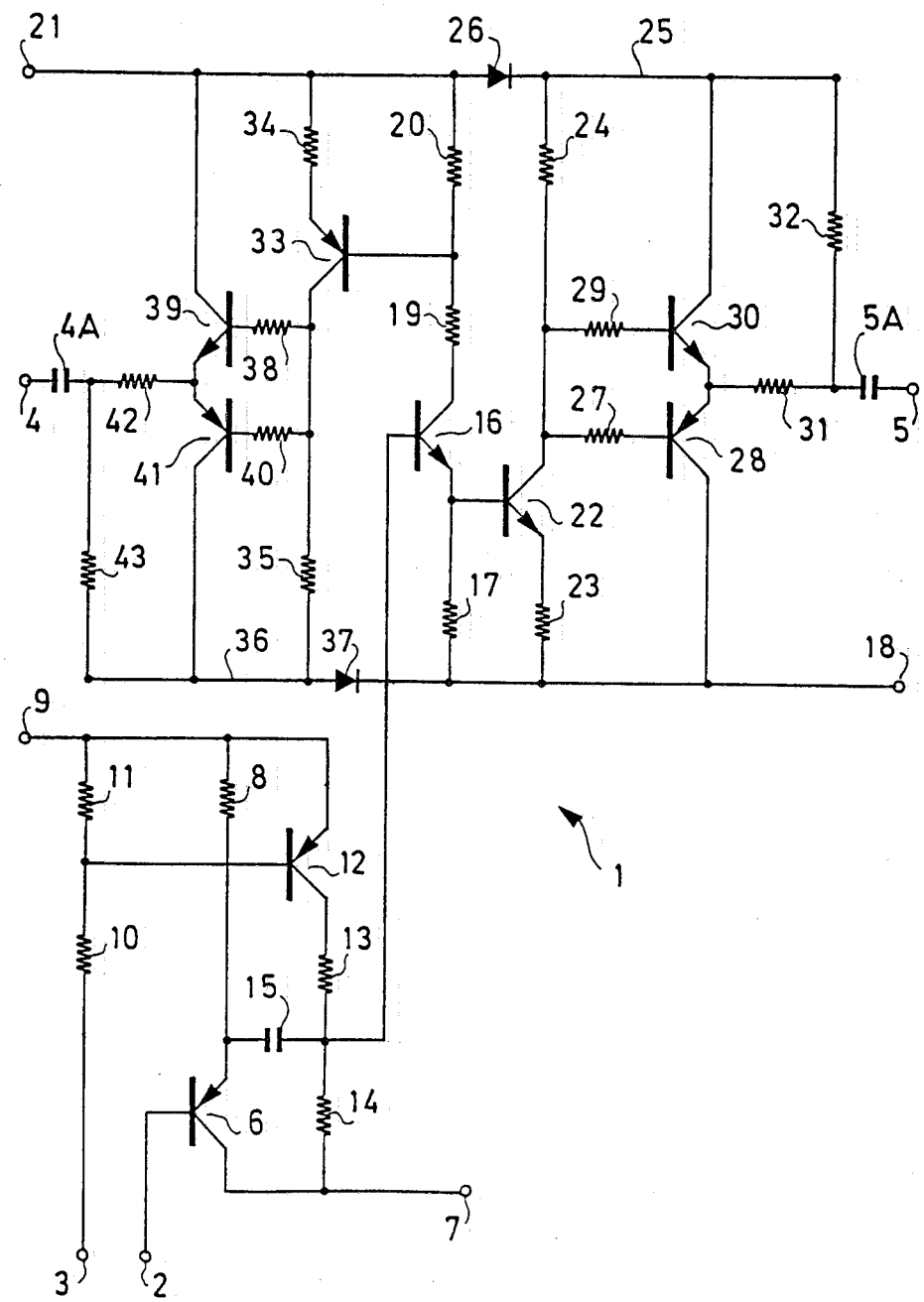

RINGING SIGNAL GENERATOR FOR A SUBSCRIBER TELEPHONE SET

BACKGROUND OF THE INVENTION

1. Field of the Invention

The present invention relates to a ringing signal generator for a subscriber telephone set.

2. Description of the Prior Art

Known ringing signal generators comprise either relays, which are space consuming or electronic circuits which are difficult to implement.

The present invention provides a ringing signal generating circuit for a subscriber telephone set for generating ringing signals of all wave shapes of even very small amplitude, this circuit being constructed according to the hybridization technique and consuming the least possible current particularly in the waiting state.

SUMMARY OF THE INVENTION

The ringing signal generator of the invention comprises a switching element controlled by logic signals followed by a 180° phase shifting circuit each output of which is connected to an amplifier circuit having a very high output impedance at rest, the switching element connecting the ringing signal source to the phase shifting circuit and the outputs of the amplifier circuits being each connected through a galvanic isolating capacitor, to a line wire.

BRIEF DESCRIPTION OF THE DRAWING

The present invention will be better understood from reading the detailed description of one embodiment taken as non-limitative example and illustrated by the accompanying drawing in which the single FIGURE is a circuit diagram of this embodiment.

DETAILED DESCRIPTION

The ringing signal generating circuit 1, the circuit diagram of which in a preferred embodiment is shown in the single FIGURE of the drawing is intended to equip a subscriber electronic telephone set but of course this circuit may also equip any device in which a signal of any available shape with respect to a reference potential is to be injected in a symmetrical line with floating potentials.

The ringing signal generating circuit 1 comprises an incident ringing input 2, a logic control signal input 3 and two symmetrical outputs 4, 5 at which two identical signals appear, identical to each other but in phase opposition and of the same frequency and wave shape as the incident ringing signal, when the logic control signal is active.

Input 2 is connected to the base of a PNP impedance transforming transistor 6 whose collector is connected to a terminal 7, itself connected to a negative bias potential which, in the present case, has a value of −5 V. The emitter of transistor 6 is connected through a resistor 8 to a terminal 9, itself connected to a positive bias potential which, in the present case, has a value of +5 V. In the present case, the circuit (not shown) connected upstream of terminal 2 comprises an output circuit for biasing the base of transistor 6 to a practically zero potential. If such circuits are not available, it is sufficient to connect the base of transistor 6 to terminals 7 and 9 through resistors of equal values sufficiently high so as not to disturb its input impedance.

Terminal 3 is connected through two series resistors 10, 11 respectively to terminal 9. The common point between resistors 10, 11 is connected to the base of a PNP switching transistor 12 whose emitter is connected directly to terminal 9 and whose collector is connected to terminal 7 through two series resistors 13, 14 respectively. The common point between resistors 13, 14 is connected, on the other hand, through a capacitor 15 to the emitter of transistor 6 and, on the other hand, to the base of an NPN transistor 16 connected as a phase-shifter.

The emitter of transistor 16 is connected through a resistor 17 to a terminal 18, itself connected to the zero volt potential. The collector of transistor 16 is connected through two series resistors 19, 20 respectively to a terminal 21, itself connected to a high positive potential, for example of +100 V.

The emitter of transistor 16 is also connected to the base of an NPN driver transistor 22. The emitter of transistor 22 is connected to terminal 18 through a resistor 23. The collector of transistor 22 is connected through a resistor 24 to a potential line 25 itself connected to the cathode of the diode 26 whose anode is connected to terminal 21. The collector of transistor 22 is also connected through a resistor 27 to the base of a PNP transistor 28 and through a resistor 29 to the base of a NPN transistor 30. The emitters of transistors 28 and 30 are connected together and through a resistor 31 in series with a capacitor 5a to terminal 5. The collector of transistor 28 is connected to terminal 18 and that of transistor 30 is connected to line 25. Line 25 is connected through a resistor 32 in series with said capacitor 5a to terminal 5. Transistor 28 and 30, connected as described above, form at rest i.e. when a disabling signal is applied to terminal 3, a very high output impedance circuit (with respect to that of the line connected to terminals 5 and 4), for the reasons explained below.

The common point between resistors 19 and 20 is connected to the base of a PNP driver transistor 33 whose emitter is connected through a resistor 34 to terminal 21. The connector of transistor 33 is connected through a resistor 35 to a potential line 36, itself connected to the anode of a diode 37 whose cathode is connected to terminal 18.

The collector of transistor 33 is also connected through a resistor 38 to the base of an NPN transistor 39 and through a resistor 40 to the base of a PNP transistor 41. The emitters of transistors 40 and 41 are connected together and, through a resistor 42 in series with a capacitor 4a, to terminal 4. Line 36 is connected through a resistor 43 in series with said capacitor 4a to terminal 4. Transistors 39 and 41, connected in the way described above, also form an amplifying circuit having a very high output impedance at rest.

The elements 22 to 32 are chosen to have the same value as elements 33 to 43 respectively in order to obtain good symmetry of the signals collected at terminals 5 and 4.

The input transistor 6, receiving the ringing signal (referenced with respect to the zero potential), is a simple impedance matcher for it is in a common collector circuit.

Transistor 12 is disabled when a logic level "1" (of about +5 V) is applied to terminal 3. The common point between resistors 13 and 14 is then at the potential of terminal 7, i.e. 5 V. Transistor 16 is therefore disabled at that time.

When a logic level "0", i.e. the zero potential, is applied to terminal 3 transistor 12 is enabled and a current flows through resistors 13 and 14.

Since the value of resistor 13 is chosen less than that of resistor 14, for example a third of the value of this latter, the common point between these two resistors is then at a positive potential enabling transistor 16. Consequently, a signal applied to terminal 2 may then be transmitted by transistor 16.

Case of a disabling signal applied to terminal 3 (logic state "1" or unconnected terminal):

When transistors 12 and 16 are disabled, the base of transistor 22 is at zero potential and it is therefore disabled, whatever the potential at its collector. Whether diode 26 is disabled or not, because transistor 22 is disabled the potential at the bases of transistors 28 and 30 is equal to the potential at the cathode of diode 26. Whether the transistor 28 is disabled or not, the potential at its emitter will then be equal to or less than the potential at the cathode of diode 26. Consequently, the potential of the base of transistor 28 is then more positive or equal to the potential at its emitter, and this transistor is therefore disabled. This causes the potential at the emitter of transistor 30 to be equal to the potential at its base, and this transistor is therefore disabled. Consequently, the impedance of circuit 1 seen from terminal 5 is practically equal to that of resistor 32, which may be chosen very high, for example 100 Kilohms.

By similar reasoning, it may be demonstrated that the same is true for the circuit comprising transistors 33, 39 and 41 and that the impedance of the circuit seen from terminal 4 is practically equal to that of the resistor 43, which is chosen equal to resistor 32.

Case of an enabling signal (0 V) applied to terminal 3:
1. in the absence of a signal at terminal 2.

The base of transistor 12 is then brought to a given potential with respect to resistors 10 and 11 forming a divider bridge between terminal 9, brought to a potential of +5 V and the zero volt potential at terminal 3. In one embodiment, the value of resistor 10 is chosen equal to about four times that of resistor 11. The potential of the base of transistor 12 is then +4 V and transistor 12 is enabled. A current then flows through resistors 13 and 14. In one embodiment, the value of resistor 14 is chosen equal to about three times that of resistor 13. The potential of their common point is then about +2.5 V. Transistor 16 is then enabled and its rest point is defined by the value of its charge resistors 19 and 20 and by its emitter resistor 17. The same is true for transistors 22 and 33 whose biasing is determined in particular by the voltage at the terminals of resistors 17 and 20 respectively.

The charge resistor and the emitter resistor of transistor 22 are determined so that the potential at its collector is substantially equal to half the potential on lines 25 (potential with respect to the reference potential 0 V at terminal 18). Transistor 28 is then slightly enabled and transistor 30 just disabled, the potential at their emitters being slightly greater (by about 0.7 V) than the potential at their bases.

The same reasoning applies to the circuit connected downstream of the common point between resistors 19 and 20, and at rest transistor 39 is slightly enabled whereas transistor 41 is just disabled.

2. When a signal is applied to terminal 2:

This signal may have any wave shape and, of course, its amplitude and/or its possible DC component must be such that they cause neither disabling nor saturation of transitor 6. This signal, after passing through transistors 6 and 16, gives two signals of the same form, but in phase opposition to each other, at the terminals of resistors 17 and 20. in the amplifier comprising the elements 22 to 33, the positive half waves of the signal from resistor 17 are simplified by transistor 30 and the negative half waves by transistor 28. Thus at terminal 5 is obtained the amplified incidence signal having the same phase. Since elements 34 to 43 are identical to those referenced respectively 23 to 27, 30, 29, 28, 31 and 32 and since transistors 33 and 22 are complementary, the amplified incident signal is obtained at terminal 4 but in phase opposition.

The purpose of diodes 26 and 37 is to maintain the impedance of the circuit seen from terminals 4 and 5 at a high value when a disabling signal is applied to terminal 3 and when external signals arrive at terminals 4 and/or 5. In fact, in this case, such externals may displace the potential of the emitters of transistors 28–30 and 39–41. Transistor 30 may then be enabled for the negative half waves of the external signals and transistor 28 may be enabled for the positive half waves of these signals, if the amplitude of these half waves exceeds a few volts. The same is true for transistors 39 and 41. The reverse direction resistance of diodes 26 and 37, which is very high, prevents the output impedance of circuit 1 seen from terminals 4 and 5 from dropping to a value of the same order of size or lower than that of the lines connected downstream of terminals 4 and 5.

The connection to the lines through capacitors 4a and 5a simplifies the call stopping circuit because of the separation potentials provided by these capacitors. Furthermore, because of these capacitors, a single supply voltage at about +100 volts is sufficient, in addition to the low power biasing voltages of +5 V and −5 V. In the ready state, which generally occupies practically the whole of the operating time of a telephone set, since all the transistors are disabled the generating circuit of the invention does not consume any current for most of the time.

The signals which are applied to terminal 2 may have a low amplitude, of the order of 1 V. These signals may be not only ringing signals but also any data signals, or speech signals, the generating circuit being then usable for interphone communication.

Since the generating circuit of the invention requires little space (constructable as a hybrid circuit) and since it is of low cost price, it may be disposed in a subscriber set. Thus, in the case of a generating circuit breakdown, only the telephone set of the subscriber which contains it can not produce ringing.

In a preferred embodiment of the invention, transistors 6, 12, 16, 22, 33, 30 (and 39), 28 (and 41) are respectively 2N907A, MPSA 92, MPSA 42, MPSA 42, MPSA 92, MJE 340, MJE350. The capacitors have a capacity of one microfarad. Resistors 8, 10, 11, 13, 14 have as respective values (in kilohms): 13-3, 9-1-7, 6-20, the tolerance on the ratio of 0.384 between the values of resistors 14 and 13 being better than 1%. The values of resistors 17, 19, 20, 23 (and 34), 24 (and 35), 27 (and 38), 29 (and 40), 31 (and 42) 32 (and 43) are respectively in kilohms: 0.787-13-0.787-0.475-20-1-1-0.22-100, the values of resistors 17 and 20 as well as those or resistors 32 and 42 being matched to better than 1%. The tolerance on the values of resistors 23, 24, 34, 35 are 1%, those on the values of resistors 27, 29, 31, 38, 40, 42 are 2% and the others 5%.

We claim:

1. A ringing signal generating circuit for a subscriber telephone set, comprising:
   an enabling circuit including a switching transistor connected to a logic control input for connecting a ringing signal;
   a phase shifting circuit, including a phase shifting transistor, connected to the output of said enabling circuit, which produces two outputs which are phase shifted by 180°;
   driving means including two drivers, each of which receives one of the outputs of said phase shifting circuit;
   amplifying means including two amplifying circuits, each receiving an output from a corresponding driver, said amplifying circuit having a very high output impedance at rest;
   output means including two galvanic isolating capacitors, each connecting the output of an amplifying circuit to a line wire; and
   impedance means including two impedance circuits, where each impedance circuit includes a resistor and a diode connected between a terminal of a supply source and the junction between a corresponding amplifier output and said galvanic isolating capacitor.

2. The ringing signal generating circuit as claimed in claim 1, wherein said ringing signal source is connected to the phase shifter through an impedance matching circuit.

3. The ringing signal generating circuit as claimed in any one of claims 1 or 2, wherein each amplifying circuit comprises, between a supply line connected to a terminal of a supply source and the other terminal of the supply source, a series circuit formed by the collector-emitter paths of an NPN transistors and of a PNP transistor, these transistors being biased to the disabled state at rest.

* * * * *